(12) United States Patent
Krause et al.

(10) Patent No.: US 8,421,387 B2
(45) Date of Patent: Apr. 16, 2013

(54) METHOD AND DEVICE FOR CONTROLLING A MOTOR

(75) Inventors: Uwe Krause, Pattensen (DE); Heinz Ludwig, Hannover (DE); Uwe Nolte, Barsinghausen (DE); Guido Sonntag, Gehrden (DE)

(73) Assignee: Siemens Aktiengesellschaft, Munich (DE)

( * ) Notice: Subject to any disclaimer, the term of this patent is extended or adjusted under 35 U.S.C. 154(b) by 308 days.

(21) Appl. No.: 12/737,067

(22) PCT Filed: May 19, 2009

(86) PCT No.: PCT/EP2009/056086
§ 371 (c)(1),
(2), (4) Date: Dec. 6, 2010

(87) PCT Pub. No.: WO2009/147013
PCT Pub. Date: Dec. 10, 2009

(65) Prior Publication Data
US 2011/0109254 A1    May 12, 2011

(30) Foreign Application Priority Data
Jun. 6, 2008 (DE) .................. 10 2008 027 113

(51) Int. Cl.
*H02P 29/00* (2006.01)
(52) U.S. Cl.
USPC .............. 318/400.17; 318/280; 318/139
(58) Field of Classification Search .......... 318/400.17, 318/280, 139, 138, 439
See application file for complete search history.

(56) References Cited

U.S. PATENT DOCUMENTS 5,264,763 A * 11/1993 Avitan ................. 318/139
5,349,279 A * 9/1994 Avitan ................. 318/803
5,675,699 A   10/1997 Yamamoto et al.
6,573,681 B2  6/2003 Schwesig
7,193,379 B2  3/2007 Beaudion et al.
2006/0056212 A1  3/2006 Schierling

FOREIGN PATENT DOCUMENTS

| CN | 2653779 | 11/2004 |
| CN | 1907832 | 2/2007 |
| DE | 195 43 873 | 12/1996 |
| DE | 100 59 173 | 3/2002 |
| DE | 10 2008 027 113.6 | 6/2008 |
| WO | PCT/EP2009/056086 | 5/2009 |

OTHER PUBLICATIONS

Peter Wratil, "Technology of Safe Drives," 2007 5th IEEE International Conference on Industrial Informatics, 2007, pp. 155-161.
Peter Wratil, "Technology of Safe Drives," 2007 5th IEEE International Conference on Industrial Informatics, 2007, 1 page Abstract only.
International Search Report for PCT/EP2009/056086, mailed on Jul. 7, 2010.
Chinese Office Action for related Chinese Patent Application No. 200980121096.4, issued on Sep. 5, 2012.

* cited by examiner

*Primary Examiner* — Walter Benson
*Assistant Examiner* — David Luo
(74) *Attorney, Agent, or Firm* — Staas & Halsey LLP

(57) ABSTRACT

A method controls a motor, especially for opening and closing a door. The motor is controlled by a pulse width-modulated switching signal that is divided into a specifiable number of pulse width-modulated control signals for actuating a bridge circuit to a corresponding number of functional channels. The functional channels are switched off independently from each other by at least one or more switch-off signals on at least one switching circuit of a number of independent switching circuits corresponding to the number of functional channels.

22 Claims, 1 Drawing Sheet

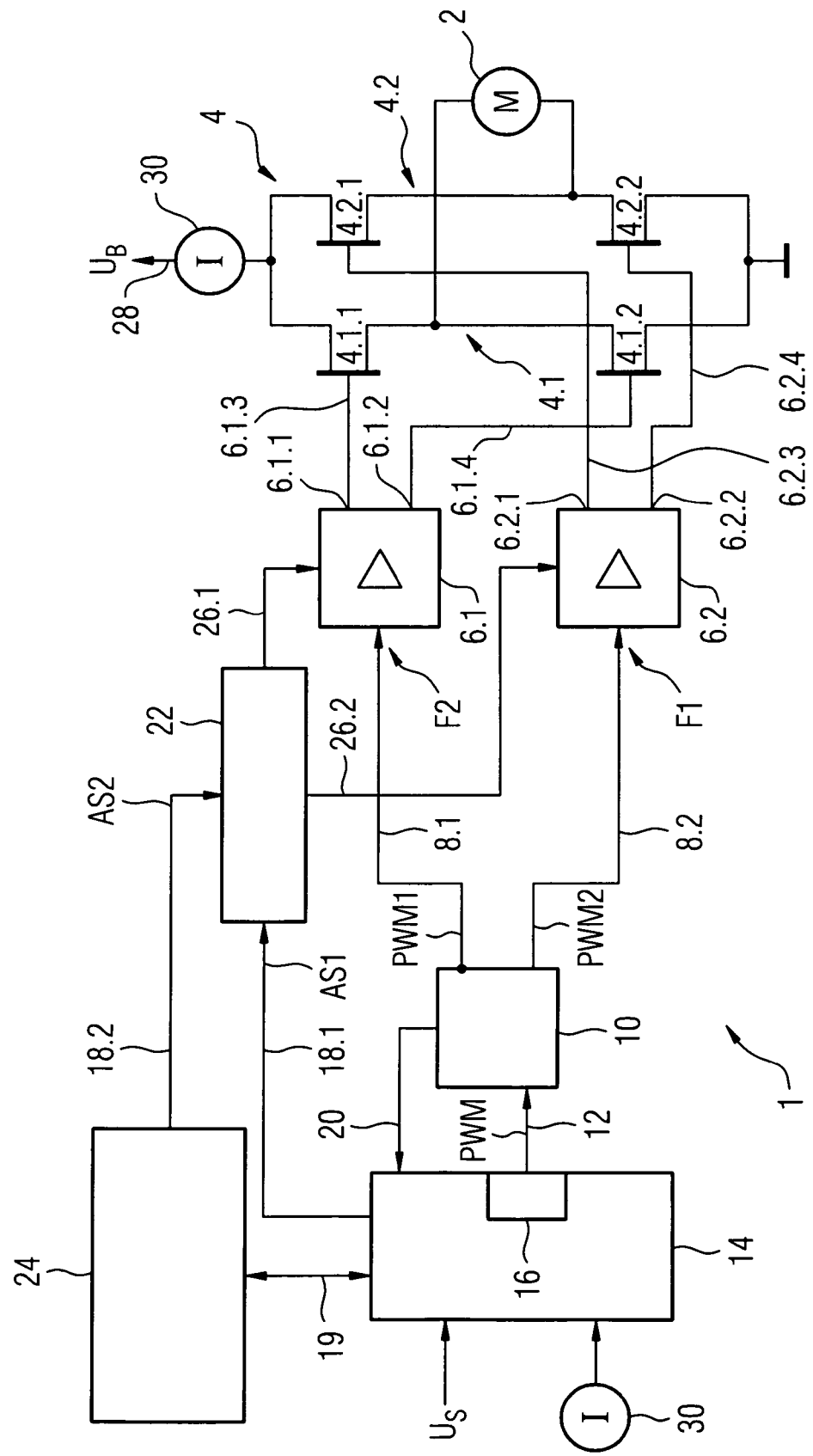

METHOD AND DEVICE FOR CONTROLLING A MOTOR

CROSS REFERENCE TO RELATED APPLICATIONS

This application is based on and hereby claims priority to International Application No. PCT/EP2009/056086 filed on May 19, 2009 and German Application No. 10 2008 027 113.6 filed on Jun. 6, 2008, the contents of which are hereby incorporated by reference.

BACKGROUND

The present invention relates to a method and a device for controlling a motor, in particular a drive motor for opening and closing a door, in which the motor is controlled using a pulse-width-modulated switching signal which is divided into a predefinable number of pulse-width-modulated control signals for driving a bridge circuit for a number of functional channels.

A variety of designs of devices for controlling the operation of an automatic door are known.

In this case, pulse-width-modulated control methods and devices, in particular, are used to control, in particular, the speed and/or direction of rotation of the motors, particularly of brushless DC motors and DC motors controlled using rotor rotary position sensors, for example Hall sensors, the motor current being manipulated on the basis of a control signal in order to change the speed.

It is known practice to drive a brushless DC motor using a bridge circuit, in particular a semiconductor bridge circuit, the motor being arranged in the bridge branch of the bridge circuit formed from electronic switching elements (usually transistors). The switching elements are driven by a driver or amplifier stage on the basis of sensor signals, for example from a contactless rotor rotary position sensor, generally a Hall element (Hall IC). In addition, drive principles without sensors are also possible.

In this case, a pulse-width-modulation controller is used to manipulate the current for the purpose of setting the speed, commutation-dependent current pulses each being chopped up into clock pulses at a constant clock frequency. In this case, the pulse width of the clock pulses is variable. This means that it is possible to indirectly change the effective motor current and thus the speed by changing the duty ratio.

Such pulse-width-modulated controllers of motors are known, for example, from DE 19543873 A1.

In the event of a fault, for example in the event of a short circuit, overload, overspeed or overexcitation, the motor is switched off using a separate independent protective circuit.

DE 100 59 173 C1 and US 2006/0056212 A1 also disclose drive control processes for a three-phase AC motor via an inverter, which drive control processes make it possible to "safely stop" and "brake" the motor "by armature short-circuiting".

SUMMARY

One potential object is specifying a method for controlling a motor, which method enables a simple fail-safe switching-off process. In addition, a particularly suitable device for controlling the motor should be specified.

The inventors propose a method for controlling a motor, in particular a drive motor for opening and closing a door, the motor is controlled using a pulse-width-modulated switching signal which is divided into a predefinable number of pulse-width-modulated control signals for driving a bridge circuit for a corresponding number of functional channels. The functional channels are switched off independently of one another using at least one or more switch-off signals in at least one of a number of mutually independent switching channels which corresponds to the number of functional channels.

As a result of such mutually independent and thus redundant switch-off signals in mutually independent and thus redundant switching channels, which engage directly in the driving of the motor, the motor can also be switched off in a defined and safe manner when an individual fault occurs. In this case, the existing mutually independent and thus likewise redundant functional channels of the bridge circuit are used for the switching-off process. This makes it possible to dispense with a separate safety switching-off process which has hitherto been necessary.

Depending on the motor—polyphase or single-phase motor—the pulse-width-modulated switching signal and/or the pulse-width-modulated control signals in the functional channels is/are determined or read back, and at least a number of mutually independent switch-off signals which corresponds to the number of control signals is generated on the basis of the switching signal which has been determined or read back and/or on the basis of the control signals which have been determined or read back, which switch-off signals are applied to the functional channels.

In the case of a single-phase motor, two control signals are generated, for example, in two independent functional channels for the purpose of controlling the motor, the two mutually independent functional channels being switched off using at least one of two mutually independent switch-off signals. In a particularly simple embodiment, the two control signals may be generated in this case from the pulse-width-modulated switching signal by simple signal division and inversion. It is also possible to generate more than two mutually independent switch-off signals for the purpose of switching off a corresponding number of functional channels and semiconductor bridges, in particular three or four, such that a multiply redundant reaction-free control arrangement is formed.

In the case of a three-phase motor, the control signals are expediently generated electronically and separately using a control unit.

For a high degree of fault protection, that is to say in order to safely switch off the motor in the event of a fault in the motor controller, in one of the drive channels and/or in the bridge circuit, a first switch-off signal is generated directly and a second, redundant switch-off signal is generated on the basis of run time monitoring of the control program for driving the motor and generating the pulse-width-modulated switching signal. As a result of such a redundant or two-channel design of the switching-off process, which acts in a simple manner on the drive channels which are likewise of redundant or two-channel design, the motor can be switched off safely, even if one of the switch-off signals fails, using the other switch-off signal. The risk of total failure of the fault switching-off process is thus minimized.

The switch-off signals are expediently generated such that they are electrically and/or logically decoupled from one another. In the case of logical decoupling, the switch-off signals are generated independently of one another using different switch-off functions if a fault occurs, for example in the event of a fault in the driving of the motor or in the event of the motor being overloaded. The electrical decoupling of the two switch-off signals is used for potential isolation from one another. As a result of the switch-off signals being decoupled, the motor is switched off safely, in the event of a fault in one of the switch-off channels, using the switch-off signals in the other fault-free switch-off channels.

In one possible embodiment, the functional channels are switched off directly and without any reaction using the first switch-off signal and/or the second switch-off signal. In this case, for freedom from reaction, the two switch-off signals are decoupled both from one another and from the functional channels. This avoids fault propagation.

The first switch-off signal and/or the second switch-off signal is/are expediently electrically decoupled from the drive channels. The electrical decoupling of the two switch-off signals is used, in particular, for potential isolation and to decouple the switch-off channels of the two switch-off signals from the drive channels in terms of energy.

For a redundant design of the functional channels of the bridge circuit for controlling a single-phase motor, for example, two mutually independent drive channels and two mutually independent amplifier stages, which are each connected to two half-bridges on the output side, are connected upstream of the bridge circuit. In this case, each amplifier stage controls precisely one half-bridge, two outputs of the amplifier stages being connected to a respective switching element of one of the half-bridges. If a switching element, an amplifier stage or a half-bridge fails, the motor can therefore be switched off using the other amplifier stage, the other switching element or the other half-bridge. In this case, the motor is preferably moved to a safe, torqueless state. As a result of the redundant drive channels and/or the redundant switch-off channels, it is thus possible to switch off the motor with single-fault safety, in particular for an automatic door drive on which high safety demands are imposed.

The device for controlling a motor comprises a control unit with integrated pulse width modulation for generating a pulse-width-modulated switching signal and a signal divider which is connected downstream of the control unit and is intended to divide the pulse-width-modulated switching signal into at least two pulse-width-modulated control signals, a predefinable number of mutually independent switch-off channels for switch-off signals branching off from the control unit and leading to a decoupling unit, from which a number of mutually independent switching channels which corresponds to the number of functional channels branches off, which switching channels can be used to switch off the functional channels independently of one another on the basis of at least one of the switch-off signals.

In this case, the switch-off signals can be generated by the control unit using the pulse-width-modulated switching signal and/or the pulse-width-modulated control signals. A readback channel for reading back the pulse-width-modulated switching signal and/or the pulse-width-modulated control signals in the two functional channels can also be routed from the signal divider to the control unit, and a corresponding number of mutually independent switch-off channels may branch off from the control unit and may lead to a decoupling unit, from which a number of switching channels which corresponds to the number of functional channels for driving the bridge circuit branches off, which switching channels engage in the functional channels.

In this case, the respective functional channel preferably comprises a drive channel and an amplifier stage for driving the bridge circuit.

In order to ensure that the motor is switched off in the event of a fault in the control program, a monitoring unit, for example a program run time monitoring unit, which acts on all switch-off channels is provided.

Another embodiment provides for the decoupling unit to comprise a number of decoupling elements, for example resistors or optocouplers, which corresponds to the number of switch-off channels and/or the number of drive channels. The switch-off channels and the drive channels are electrically decoupled from one another using the decoupling elements and are therefore reaction-free.

The bridge circuit preferably has two or more channels, for example is in the form of a so-called H-bridge circuit or a B6-bridge circuit. A corresponding bridge circuit is provided depending on the type of motor-single-phase or three-phase motor.

In addition, the bridge circuit advantageously comprises a corresponding number of switching elements, in particular semiconductor switching elements, for example transistors. The bridge circuit is expediently connected to the motor on the load side and to the two drive channels on the control side.

In order to drive the motor in a safe and redundant manner, the drive channels for the bridge circuit are independent of one another. For this purpose, an amplifier stage is preferably arranged upstream of the bridge circuit in the respective drive channel. For a redundant design of the drive channels, the respective amplifier stage is connected to a half-bridge on the output side. It is thus possible to switch off the motor with single-fault safety as a result of the redundant drive channels.

In addition to the motor being switched off in a fail-safe manner in the event of a fault in the driving of the motor, a current sensor is arranged in the motor branch, for example in the supply branch, the measurement signal from which sensor can be supplied to the control unit. If overloading of the motor is identified by evaluating the measurement signal from the current sensor, this is deemed to be a fault in a similar manner to a fault identified in the motor controller, with the result that the control unit generates the switch-off signals and the motor is switched off via the redundant switch-off channels which engage in the redundant drive channels. An additional separate safety circuit is thus avoided.

In order to control the motor using pulse width modulation, a pulse width modulator is integrated in the control unit in one development. Additional components are avoided by simply implementing the pulse width modulator as a software module in the control unit.

Furthermore, the proposals provide for the switch-off channels and/or the generation of the switch-off signals and thus the switch-off function of the motor to be able to be tested independently of one another.

Depending on the application, the motor is a drive motor, in particular a DC motor, for moving, in particular opening and closing, door elements, for example door leaves or door wings. In this case, the device is expediently used as a control device for an automatic door.

BRIEF DESCRIPTION OF THE DRAWING

These and other objects and advantages of the present invention will become more apparent and more readily appreciated from the following description of the preferred embodiments, taken in conjunction with the accompanying drawing, which is a schematic view of one potential embodiment for a device for controlling a motor.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In this case, the single FIGURE shows a device 1 for controlling a motor 2. The motor 2 may be, in particular, a drive motor, in particular a DC motor, for moving, in particular opening and closing, door elements, for example door leaves or door wings.

The motor 2 illustrated is connected to an operating voltage $U_B$, for example a mains voltage or a high-performance or high-voltage energy store.

A conventional bridge circuit 4, to which the motor 2 is connected as a load, is provided in order to control the motor. The bridge circuit 4 is formed from a number of switching elements 4.1.1 to 4.2.2, for example semiconductor elements or transistors, and is a so-called H-bridge circuit, for example. In this case, the switching elements 4.1.1 and 4.1.2 form one half-bridge 4.1 and the switching elements 4.2.1 and 4.2.2 form the other half-bridge 4.2 of the bridge circuit 4.

The bridge circuit 4 may vary depending on the type and design of the motor 2 and/or the mains supply (single-phase or polyphase). A so-called B6-bridge circuit (for example three half-bridges) may be provided, for example.

In order to drive the motor 2, the bridge circuit 4 is connected, via two amplifier stages 6.1 and 6.2, to two drive channels 8.1 and 8.2 which are connected to a control unit 14 via a signal divider 10 and a control line 12. In this case, one drive channel 8.1 or 8.2 respectively forms, with the associated amplifier stage 6.1 or 6.2, a functional channel F1 or F2 for driving the bridge circuit 4. The two functional channels F1 and F2 are mutually independent and are thus redundant.

For a redundant design of the drive channels 8.1 and 8.2 and thus in order to drive the bridge circuit 4 in a redundant manner, the respective amplifier stage 6.1 and 6.2 has two outputs 6.1.1, 6.1.2 or 6.2.1, 6.2.2. As a result of this, the two half-bridges 4.1 and 4.2 are controlled, using each amplifier stage 6.1 or 6.2, by virtue of the two outputs 6.1.1, 6.1.2 of one amplifier stage 6.1 being connected to a respective switching element 4.1.1 or 4.1.2 of the relevant half-bridge 4.1 via associated lines 6.1.3 and 6.1.4. In a similar manner, the outputs 6.2.1, 6.2.2 of the other amplifier stage 6.2 are connected to a respective switching element 4.2.1 or 4.2.2 of the relevant half-bridge 4.2 via associated lines 6.2.3 and 6.2.4. If one or more elements in a functional channel F1 or F2 or in one of the half-bridges 4.1 or 4.2 fail(s), the motor 2 can therefore be switched off and moved to a safe operating state using the other amplifier stage 6.2 or 6.1, one of the other switching elements 4.1.1 to 4.2.2 or the other half-bridge 4.2 or 4.1. This makes it possible to switch off the motor 2 with single-fault safety.

In the exemplary embodiment shown in the FIGURE, it is a single-phase motor 2 which is driven using an H-bridge as the bridge circuit 4. In the case of a three-phase motor, in particular, a corresponding number of functional channels and drive channels with amplifier stages as well as switch-off channels, for example three mutually independent channels in each case, would alternatively be provided in a manner not illustrated in any more detail.

The method is described in more detail below using a single-phase motor 2 with redundant functional channels F1, F2 and switch-off channels 18.1 and 18.2.

During operation of the motor 2, the bridge circuit 4, in particular the switching elements 4.1.1 to 4.2.2, is/are controlled using a pulse-width-modulated switching signal PWM generated by the control unit 14. For this purpose, the control unit 14 comprises an integrated pulse width modulator 16.

The pulse-width-modulated switching signal PWM generated is supplied to the signal divider 10 which divides the pulse-width-modulated switching signal PWM into two pulse-width-modulated control signals PWM1 and PWM2 for the two drive channels 8.1 and 8.2. The signal divider 10 can alternatively be dispensed with; in such a case, the redundant control signals PWM1, PWM2 are generated by the control unit 14.

In this case, the signal divider 10 comprises an inverter circuit, for example, with the result that the output of the signal divider 10 always drives the two half-bridges 4.1 and 4.2 inversely with respect to one another and there is therefore no freewheeling operation of the motor 2. In this case, the control signal PWM1 is the inverse of the control signal PWM2.

In order to safely switch off the motor 2 in the event of a fault in the motor controller, for example in the event of a fault in the program control of the control unit 14, the signal divider 10, one of the amplifier stages 6.1, 6.2, or one of the elements in the bridge circuit 4, the device 1 comprises two redundant and mutually independent switch-off channels 18.1 and 18.2.

In order to generate switch-off signals AS1 and AS2, a read-back channel 20 for reading back the pulse-width-modulated switching signal PWM and/or the pulse-width-modulated control signals PWM1, PWM2 in the two drive channels 8.1, 8.2 is routed from the signal divider 10 to the control unit 14. Instead of reading back the pulse-width-modulated switching signal PWM and/or the control signals PWM1, PWM2, said signals can also be directly taken into account by the control unit 14, when being generated by the latter itself, in order to generate the switch-off signals AS1 and AS2.

At least one of the two mutually independent switch-off channels 18.1 and 18.2, namely the switch-off channel 18.1, branches off directly from the control unit 14. A monitoring unit 24 is connected upstream of the other switch-off channel 18.2, a control signal for monitoring the program run time being connected upstream of said monitoring unit 24 via a monitoring line 19. Both switch-off channels 18.1 and 18.2 lead to a decoupling unit 22.

In this case, the two switch-off signals AS1, AS2 are generated independently of one another on the basis of the pulse-width-modulated switching signal PWM which has been read back and/or the pulse-width-modulated control signals PWM1, PWM2 which have been read back. For this purpose, a corresponding software program with appropriate logic functions is implemented in the control unit 14.

One of the switch-off signals AS1 is generated directly and is used directly to switch off the functional channels F1, F2. The other, redundant switch-off signal AS2 is additionally generated on the basis of program run time monitoring and is used to switch off the functional channels F1, F2. For this purpose, a monitoring unit 24 for monitoring the run time of the control program for the motor 2 is integrated upstream of the associated switch-off channel 18.2.

The two switch-off signals AS1, AS2 and their switch-off channels 18.1 and 18.2 are electrically decoupled, for example, from one another and from the functional channels F1 and F2 by the decoupling unit 22, with the result that the two functional channels F1 and F2 are switched off directly and without any reaction using the first switch-off signal AS1 and/or the second switch-off signal AS2. For this purpose, the decoupling unit 22 comprises a number of decoupling elements, for example optocouplers or resistors (not illustrated in any more detail), which corresponds to the number of switch-off channels 18.1, 18.2 and/or functional channels F1, F2 and thus drive channels 8.1, 8.2.

For a redundant design of the fault switching-off process for the motor 2, a number of switching channels 26.1, 26.2 which corresponds to the number of functional channels F1, F2 in the bridge circuit 4 branches off from the decoupling unit 22.

As a result of such a redundant design of the fault switching-off process with redundant switch-off signals AS1, AS2 in redundant switch-off channels 18.1, 18.2, which directly engage in the redundant driving of the motor 2, the motor can also be switched off in a defined and safe manner when an individual fault occurs. In this case, both amplifier stages 6.1 and 6.2 and thus each half-bridge 4.1 and 4.2 are switched off if at least one of the switch-off signals AS1 and/or AS2 occurs. If one of the amplifier stages 6.1 or 6.2 or one of the half-bridges 4.1 or 4.2 or one of the switching elements 4.1.1 to 4.2.2 is defective, the motor 2 can always be switched off and moved to a safe state using the other amplifier stage 6.2 or 6.1, the other half-bridge 4.2 or 4.1 or the other switching elements 4.1.1 to 4.2.2 on account of the redundant driving described. The risk of total failure of the fault switching-off process is thus considerably reduced.

In addition to the motor 2 being switched off in a fail-safe manner in the event of a fault in the driving of the motor 2, a current sensor 30 is arranged in the motor branch, for example in the supply branch 28, the measurement signal from which sensor can be supplied to the control unit 14. If overloading of the motor 2 is identified by evaluating the measurement signal from the current sensor 30, the switch-off signals AS1, AS2 are generated using the control unit 14 in a similar manner to an identified fault in the motor controller and the motor 2 is switched off via the redundant switch-off channels 18.1, 18.2 which engage in the redundant functional channels F1, F2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for controlling a motor, comprising:
dividing a pulse-width-modulated switching signal into a predefined plural number of pulse-width-modulated control signals;
defining a functional channel for each pulse-width-modulated control signal such that there is the predefined plural number of functional channels;
driving a bridge circuit with the functional channels;
controlling and driving the motor with the bridge circuit;
generating a mutually independent switch-off signal for each functional channel such that the predefined plural number of switch-off signals is generated;
supplying the switch-off signals independently of one another, to a decoupling unit;
decoupling the switch-off signals from one another in the decoupling unit; and
switching off the functional channels independently of one another on the basis of at least one of the switch-off signals.

2. The method as claimed in claim 1, wherein
the pulse-width-modulated switching signal and/or the pulse-width-modulated control signals in the functional channels is/are determined or read back, and
the switch-off signals are generated on the basis of the switching signal which has been determined or read back and/or on the basis of the control signals which have been determined or read back.

3. The method as claimed in claim 1,
wherein a first switch-off signal is generated directly.

4. The method as claimed in claim 1,
wherein a second, redundant switch-off signal is generated independently of a first switch-off signal.

5. The method as claimed in claim 4,
wherein the second switch-off signal is generated based on program run time monitoring.

6. The method as claimed in claim 1,
wherein the switch-off signals are generated such that they are electrically and/or logically decoupled from one another.

7. The method as claimed in claim 1, wherein all functional channels are switched off directly and without any reaction even if only one switch-off signal is received.

8. The method as claimed in claim 7,
wherein at least one of the switch-off signals is electrically decoupled from the functional channels.

9. The method as claimed in claim 1,
wherein the motor is switched to a safe, torqueless state when at least one of the switch-off signals is present.

10. The method as claimed in claim 1,
wherein after decoupling, all switch-off signals become positive even if only one switch-off signal is positive before decoupling using one of the switch-off signals (AS1, AS2)].

11. The method as claimed in claim 1 wherein each switch off signal is associated with a respective functional channel to switch off the respective functional channel.

12. The method as claimed in claim 1 wherein the motor is a motor for opening and closing a door.

13. A device for controlling a motor, comprising:
a control unit with an integrated pulse width modulator to generate a pulse-width-modulated switching signal;
a signal divider downstream from the pulse width modulator, to divide the pulse-width-modulated switching signal into a predefined plural number of pulse-width-modulated control signals;
a functional channel for each pulse-width-modulated control signal such that there is the predefined plural number of functional channels;
a bridge circuit driven by the functional channels to control the motor; and
a decoupling unit to receive a plurality of switch-off signals, at least one of which is branched off from the control unit, and to generate a mutually independent switching channel for each functional channel such that the predefined plural number of switching channels is generated, the switching channels being used to switch off the functional channels independently of one another on the basis of at least one of the switch-off signals.

14. The device as claimed in claim 13, wherein
a read-back channel reads back the pulse-width-modulated switching signal and/or the pulse-width-modulated control signals in the two functional channels, and
the read-back channel is routed from the signal divider to the control unit.

15. The device as claimed in claim 13, wherein
the bridge circuit has two half-bridges,
there are two functional channels, and
each functional channel comprises a drive channel and an amplifier stage for independently driving one of the half-bridges.

16. The device as claimed in claim 13,
wherein a monitoring unit is integrated in one of the switch-off channels.

17. The device as claimed in claim 13, wherein the decoupling unit comprises a decoupling element for each switch-off channel and each functional channel such that the decoupling unit contains the predetermined plural number of decoupling elements.

18. The device as claimed in claim 13, wherein
the bridge circuit has two or more channels, and
the bridge circuit is an H-bridge circuit or a B6 bridge circuit.

19. The device as claimed in claim 13, wherein the bridge circuit comprises a switching element for each functional channel such that there are the predefined plural number of switching elements.

20. The device as claimed in claim 13,
wherein the bridge circuit is connected to the motor on a load side and is connected to the functional channels on a control side.

21. The device as claimed in claim 13,
wherein the motor is a DC drive motor, for opening and closing door elements.

22. A method comprising using a device to control an automatic door, the device comprising:

a control unit with an integrated pulse width modulator for generating a pulse-width-modulated switching signal;
a signal divider downstream from the pulse width modulator, to divide the pulse-width-modulated switching signal into a predefined plural number of pulse-width-modulated control signals;
a functional channel for each pulse-width-modulated control signal such that there is the predefined plural number of functional channels;
a bridge circuit driven by the functional channels to control the motor; and
a decoupling unit to receive a plurality of switch-off signals, at least one of which is branched off from the control unit, and to generate a mutually independent switching channel for each functional channel such that the predefined plural number of switching channels is generated, the switching channels being used to switch off the functional channels independently of one another on the basis of at least one of the switch-off signals.

* * * * *